(12) United States Patent
Zhang

(10) Patent No.: US 11,093,313 B2
(45) Date of Patent: Aug. 17, 2021

(54) TECHNOLOGIES FOR ERROR HANDLING FOR HIGH SPEED I/O DATA TRANSFER

(71) Applicant: INTEL CORPORATION, Santa Clara, CA (US)

(72) Inventor: Ning Zhang, Beijing (CN)

(73) Assignee: INTEL CORPORATION, Santa Clara, CA (US)

(*) Notice: Subject to any disclaimer, the term of this patent is extended or adjusted under 35 U.S.C. 154(b) by 20 days.

(21) Appl. No.: 16/080,744

(22) PCT Filed: Mar. 31, 2016

(86) PCT No.: PCT/CN2016/077967
§ 371 (c)(1),
(2) Date: Aug. 29, 2018

(87) PCT Pub. No.: WO2017/166153
PCT Pub. Date: Oct. 5, 2017

(65) Prior Publication Data
US 2019/0026178 A1    Jan. 24, 2019

(51) Int. Cl.
*G06F 11/07* (2006.01)
*G06F 11/36* (2006.01)
(Continued)

(52) U.S. Cl.
CPC ...... *G06F 11/0781* (2013.01); *G06F 11/0772* (2013.01); *G06F 11/08* (2013.01);
(Continued)

(58) Field of Classification Search
CPC .. G06F 11/0772; G06F 11/0781; G06F 11/08; G06F 11/221; G06F 11/2221; G06F 11/36; G01R 31/316
See application file for complete search history.

(56) References Cited

U.S. PATENT DOCUMENTS

2007/0283072 A1    12/2007  Johnson
2007/0294440 A1*   12/2007  Haku ............... G06K 19/07732
                                                          710/62
(Continued)

FOREIGN PATENT DOCUMENTS

CN    1973253 A     5/2007
CN    101808343 A   8/2010
CN    101976074 A   2/2011

OTHER PUBLICATIONS

PCT Search Report and Written Opinion prepared for PCT/CN2016/077967, completed Dec. 1, 2016.
(Continued)

*Primary Examiner* — Bryce P Bonzo
*Assistant Examiner* — Michael Xu
(74) *Attorney, Agent, or Firm* — Hanley, Flight & Zimmerman, LLC

(57) ABSTRACT

Technologies for error handling of high speed input/output (I/O) data transfer is disclosed. Before a data transfer between an external I/O device (such as an SDIO card, other SDIO device, or USB device) and an I/O host controller of a compute device, tuning registers of the I/O host controller may be set. If the data transfer is unsuccessful, the compute device may access a table stored in the I/O host controller (or stored elsewhere in the compute device) which includes other sets of values of the tuning registers that may be used to successfully transfer data, and then attempt the data transfer with another set of values of the tuning registers. In order to initialize the table with sets of values that may be used, the compute device first performs test data transfers with various settings of the tuning registers.

25 Claims, 6 Drawing Sheets

(51) Int. Cl.
*G06F 11/22* (2006.01)
*G06F 11/08* (2006.01)

(52) U.S. Cl.
CPC ........ *G06F 11/221* (2013.01); *G06F 11/2221* (2013.01); *G06F 11/36* (2013.01)

(56) References Cited

U.S. PATENT DOCUMENTS

| | | | |
|---|---|---|---|
| 2014/0185388 A1* | 7/2014 | Vaysman | G06F 13/4086 |
| | | | 365/185.23 |
| 2014/0266627 A1 | 9/2014 | Padilla et al. | |
| 2015/0212954 A1* | 7/2015 | Horowitz | G06F 13/4072 |
| | | | 710/110 |
| 2016/0049203 A1* | 2/2016 | Alrod | G06F 11/073 |
| | | | 714/2 |
| 2016/0132256 A1* | 5/2016 | Jung | G06F 3/0629 |
| | | | 711/103 |
| 2018/0061498 A1* | 3/2018 | Hazama | G06F 3/061 |

OTHER PUBLICATIONS

SDIO Specifications, Part E1, SDIO Simplified Specification, Version 3.00, Feb. 25, 2011.

\* cited by examiner

TECHNOLOGIES FOR ERROR HANDLING FOR HIGH SPEED I/O DATA TRANSFER

CROSS REFERENCE TO RELATED APPLICATIONS

The present application claims priority to and is a national stage entry under 35 USC § 371(b) of International Application No. PCT/CN2016/077967, which was filed Mar. 31, 2016, entitled "TECHNOLOGIES FOR ERROR HANDLING FOR HIGH SPEED I/O DATA TRANSFER."

BACKGROUND

With the development of high speed data transfer from an external device to a host controller on a compute device such as the SD/SDIO protocol, maintaining the stability of the data transferred on the input/output (I/O) bus has become a significant problem for the I/O host controller designer and the driver developer. For example, in many cases, a high error rate may be incurred during a high speed data transfer. High error rates at a high speed data transfer may be addressed by reducing the speed of the data transfer, which may be undesirable in some applications.

In some cases, the stability of the data transfer may depend on the specific embodiment of the I/O host controller. For example, the stability may depend on the circuit board to which the I/O host controller is connected, or even on which driver is used. Furthermore, the stability may depend on the I/O device with which the I/O host controller is communicating.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
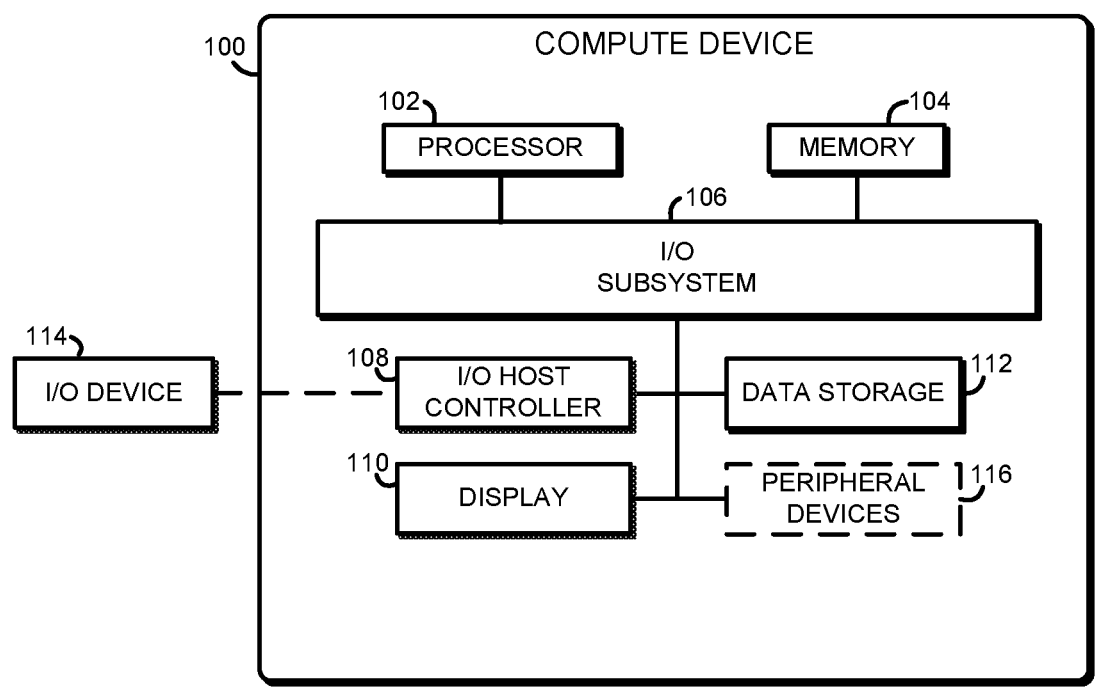
FIG. 1 is a simplified block diagram of at least one embodiment of a compute device for transferring data with an I/O host controller.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C): (A and B); (B and C); (A and C); or (A, B, and C). Similarly, items listed in the form of "at least one of A, B, or C" can mean (A); (B); (C): (A and B); (B and C); (A and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, an illustrative compute device 100 includes an input/output (I/O) host controller 108 configured to communicate with an I/O device 114 to transfer data to and from the I/O device 114. In use, as described in more detail below, the compute device 100 initially tests possible settings of tuning registers 202 of the I/O host controller 108 by performing a test data transfer with each possible setting (see FIG. 2 below for more details of the tuning registers 202). The value of the tuning registers 202 may indicate which edge of an associated clock signal the I/O host controller 108 is to read or write on (i.e., rising edge or falling edge), the delay tuning for writing, and/or other parameters of the communication between the I/O host controller 108 and the I/O device 114. For each successful test data transfer, the corresponding tuning registers values are stored in the I/O host controller 108. In a subsequent active or "non-test" data transfer, one of the stored tuning registers values sets is applied to the tuning registers 202, and the data transfer is begun. If an error is encountered, a tuning registers values set similar to the presently used one is applied, and the data transfer is resumed. Additionally, when a data transfer is unsuccessful with a tuning registers values set, a weight value corresponding to that particular tuning registers values set is decreased in the I/O host controller 108. When a data transfer is successful with a tuning registers values set, a weight value corresponding to that particular tuning registers values set is increased in the I/O host controller 108. The initial tuning registers values set to be used for data transfer may be based on the weight values stored in the I/O host controller 108.

The compute device 100 may be embodied as any type of compute device capable of performing the functions described herein. For example, the compute device 100 may be embodied as or otherwise be included in, without limitation, a smartphone, a cellular phone, an embedded computing system, a System-on-a-Chip (SoC), a desktop computer, a server computer, a tablet computer, a notebook computer, a laptop computer, a wearable computer, a handset, a messaging device, a camera device, a multiprocessor system, a processor-based system, a consumer electronic device, and/or any other compute device. The illustrative compute device 100 includes a processor 102, a memory 104, an I/O subsystem 106, the input/output (I/O) host controller 108, a display 110, and data storage 112. In some embodiments, one or more of the illustrative components of the compute device 100 may be incorporated in, or otherwise form a portion of, another component. For example, the memory 104, or portions thereof, may be incorporated in the processor 102 in some embodiments.

The processor 102 may be embodied as any type of processor capable of performing the functions described herein. For example, the processor 102 may be embodied as a single or multi-core processor(s), a single or multi-socket processor, a digital signal processor, a graphics processor, a microcontroller, or other processor or processing/controlling circuit. Similarly, the memory 104 may be embodied as any type of volatile or non-volatile memory or data storage capable of performing the functions described herein. In operation, the memory 104 may store various data and software used during operation of the compute device 100 such as operating systems, applications, programs, libraries, and drivers. The memory 104 is communicatively coupled to the processor 102 via the I/O subsystem 106, which may be embodied as circuitry and/or components to facilitate input/output operations with the processor 102, the memory 104, and other components of the compute device 100. For example, the I/O subsystem 106 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 106 may form a portion of a system-on-a-chip (SoC) and be incorporated, along with the processor 102, the memory 104, and other components of the compute device 100 on a single integrated circuit chip.

The I/O host controller 108 may be embodied as any type of device capable of transferring data to and/or from an I/O device 114, which may be an external I/O device. For example, the I/O host controller 108 may be embodied as an SDIO host controller, a USB host controller, or the like and the corresponding I/O device may be an SD card or other SDIO device, a USB device, or the like. In the illustrative embodiment, the I/O host controller 108 is communicatively coupled to the processor 102 and/or the memory 104 through the I/O subsystem 106. In some embodiments, the I/O host controller 108 may form a portion of the processor 102 and/or the memory 104. In additional embodiments, the I/O host controller 108 may form a portion of an SoC and be incorporated, along with the processor 108, the memory 104, the I/O subsystem 106, and other components of the compute device 100 on a single integrated circuit chip.

The display 110 may be embodied as any type of display on which information may be displayed to a user of the compute device 100, such as a liquid crystal display (LCD), a light emitting diode (LED) display, a cathode ray tube (CRT) display, a plasma display, an image projector (e.g., 2D or 3D), a laser projector, a touchscreen display, a heads-up display, and/or other display technology.

The data storage 112 may be embodied as any type of device or devices configured for the short-term or long-term storage of data. For example, the data storage 112 may include any one or more memory devices and circuits, memory cards, hard disk drives, solid-state drives, or other data storage devices.

Of course, in some embodiments, the compute device 100 may include other or additional components, such as those commonly found in a compute device. For example, the compute device 100 may also have peripheral devices 116 such as a keyboard, a mouse, a communication circuit, etc.

Figure 2:
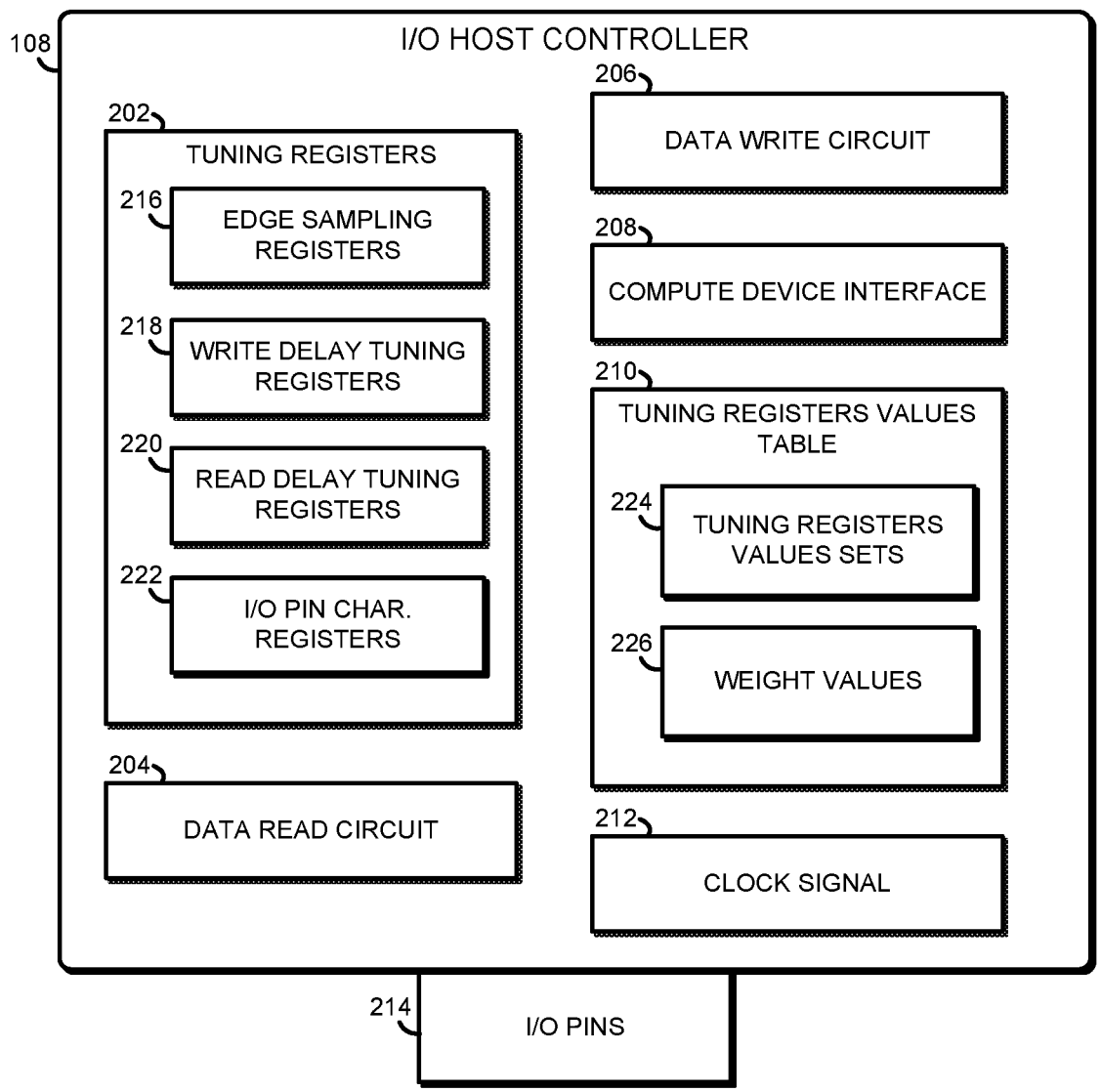
FIG. 2 is a simplified block diagram of at least one embodiment of the I/O host controller of FIG. 1.

Referring now to FIG. 2, the I/O host controller 108 includes tuning registers 202, a data read circuit 204, a data write circuit 206, a compute device interface 208, a tuning registers values table 210, a clock signal 212, and I/O pins 214. In the illustrative embodiment, each of the tuning registers 202, the tuning registers values table 210, and I/O pins 214 are embodied as hardware, and the data read circuit 204, data write circuit 206, and the compute device interface 208 are embodied as a combination of hardware and firmware. In some embodiments, any of the tuning registers 202, the tuning registers values table 210, the data read circuit 204, the data write circuit 206, and the compute device interface 208 may be embodied as hardware, software, firmware, or a combination thereof. Of course, in every embodiment each of the data read circuit 204 and the data write circuit 206 include the necessary hardware to implement the desired tuning based on the tuning registers 202, as described in more detail below.

The illustrative tuning registers 202 include edge sampling tuning registers 214, write delay tuning registers 216, read delay tuning registers 218, and I/O pin characteristics registers 220. Of course, in some embodiments, some of those tuning registers 202 may not be present and/or additional tuning registers may be present. Each of the tuning registers 202 are embodied as a register or other memory location accessed by the I/O host controller to tune a reading and/or writing operation of the I/O host controller during a data transfer. The register or memory location may be any type of volatile or non-volatile memory. In the illustrative embodiment, there is one register of each type of registers for each I/O pin 214 of the I/O host controller (i.e., one edge sampling register 214, one write delay tuning register 216, etc. for each I/O pin 214). In other embodiments, one register of each type may control the behavior of more than one I/O pin 214 (i.e., one edge sampling register 214 may control the sampling edge for two or more of the I/O pins 214). Of course, in some embodiments, some registers may control a single I/O pin 214 and other registers may control more than one I/O pin 214.

The edge sampling registers 216 indicate at which edge of the clock signal 212 the I/O host controller 108 samples one or more corresponding I/O pins 214 (i.e., the rising edge or the falling edge). The edge sampling registers 216 are embodied as at least a single bit register to indicate one of the two possibilities.

The write delay tuning registers 218 indicate a temporal write delay that the I/O host controller 108 is to use when writing to the one or more corresponding I/O pins 214. The write delay tuning registers 218 may represent the numerical temporal write delay in any format, such as integer, double, float, or other format. In the illustrative embodiment, the write delay tuning registers 218 may indicate a relatively small number of delay choices separated by an integral number of a delay step, such as negative 8 to positive 7 of the delay step. Those 16 possibilities could be represented by a four-bit register. The delay step may be, in some embodiments, 0.1, 0.2, 0.5, 1, 2, 5, 10, 20, 50, or 100 nanoseconds. For example, with a delay step of 1 nanosecond and a four-bit register, the write delay tuning register may indicate a delay of negative 8 nanoseconds to positive 7 nanoseconds. In other embodiments, more or fewer possibilities could be used with a larger or smaller register. Additionally or alternatively, in some embodiments, the delay step between adjacent delay values may not be uniform.

The read delay tuning registers 220 indicate a temporal read delay that the I/O host controller 108 is to use when reading from the one or more corresponding I/O pins 214. The read delay tuning registers 220 may represent the numerical temporal read delay in any format, similar to the write delay tuning registers. In the illustrative embodiment, the read delay tuning registers 220 indicate the delay in a similar manner as the write delay tuning registers 218 described above. Of course, in some embodiments, the format or register size used by the read delay tuning registers 220 may be different from the format or register size used by the write delay tuning registers 218.

The I/O pin characteristics registers 222 indicate a termination impedance that the I/O host controller 108 is to use when reading from the one or more corresponding I/O pins 214. The I/O pin characteristics registers 222 may represent the numerical termination impedance in any format, such as integer, double, float, or other format. The I/O pin characteristics register 222 may indicate a termination impedance of any value that is or is close to the nominal impedance of each of the I/O pins 214, such as 40, 45, 50, 55, 60, 65, 70, 75, 80, 85, 90, 95, 100, 105, or 110 ohms. In some embodiments, one value of the I/O pin characteristics registers 222 indicates that a high impedance should be used.

It should be appreciated that, in some embodiments, the tuning registers 202 may indicate a value that the I/O host controller 108 may not be able to implement. For example, the write delay tuning registers 218 may be 32 bits wide, with 2^32 possible values of each write delay tuning register 218, but the I/O host controller 108 may only be able to implement 16 different write tuning delays. In such an embodiment, the I/O host controller 108 may be configured to implement the behavior closest to that indicated by the corresponding tuning register 202.

The data read circuit 204 is configured to read data from the I/O pins 214 and the data write circuit 206 is configured to write data to the I/O pints 214. Each of the data read circuit 204 and the data write circuit 206 implements the settings indicated by the tuning registers 202 as necessary. For example, the illustrative data read circuit 204 is enabled to sample on either the rising edge or the falling edge of the clock signal 212 based on the edge sampling registers 216, is enabled to delay a read timing based on the read delay tuning registers 220, and is enabled to change the termination impedance of one or more I/O pins 214 based on the I/O pin characteristics registers 222. Similarly, the illustrative data write circuit 206 is enabled to delay a write timing based on the write delay tuning registers 218.

The compute device interface 208 is configured to communicate with other elements of the compute device 100, such as the processor 102 and/or the memory 104. The compute device interface 208 may use any means of communication in order to communicate with the other elements of the compute device 100.

The tuning registers values table 210 is configured to store information indicating which tuning registers values are likely to lead to a successful data transfer. In the illustrative embodiment, the tuning registers values table 210 includes entries in the table, wherein each entry includes a tuning registers value set 224 and a weight value 226. Each weight value 226 indicates a past performance of data transfers using the corresponding tuning registers values set. In the illustrative embodiment, the tuning registers values table 210 is stored in non-volatile memory of the I/O host controller 108. In other embodiments, the tuning registers values table 210 may be stored in the memory 104 or the data storage 112.

The clock signal 212 is a signal used to synchronize the reading and/or writing of the I/O host controller 108 to the I/O pins 214. The clock signal 212 may be generated by or using a crystal, a clock signal generating circuit, or other mechanism usable to generate a suitable clock signal. In some embodiments, the clock signal 212 may be synchronized to another clock device of the compute device 100, such as a clock signal of the processor 102 or a clock signal of the I/O bus 106. In other embodiments, the clock signal 212 may be independent of any other clock signal of the compute device 100. In some embodiments, the clock signal 212 may be used as a clock signal for processing or other actions done in the I/O host controller 108 besides those directly related to reading and/or writing the I/O pins 214, and in other embodiments it may be used only for actions directly related to reading and/or writing the I/O pins 214.

The I/O pins 214 may be any type of electrical contact which allows the I/O host controller 108 to communicate with the I/O device 114. For example, the I/O pins 214 may be embodied as, but not limited to, one or more pins, pads, and/or other electrical contacts.

Figure 3:
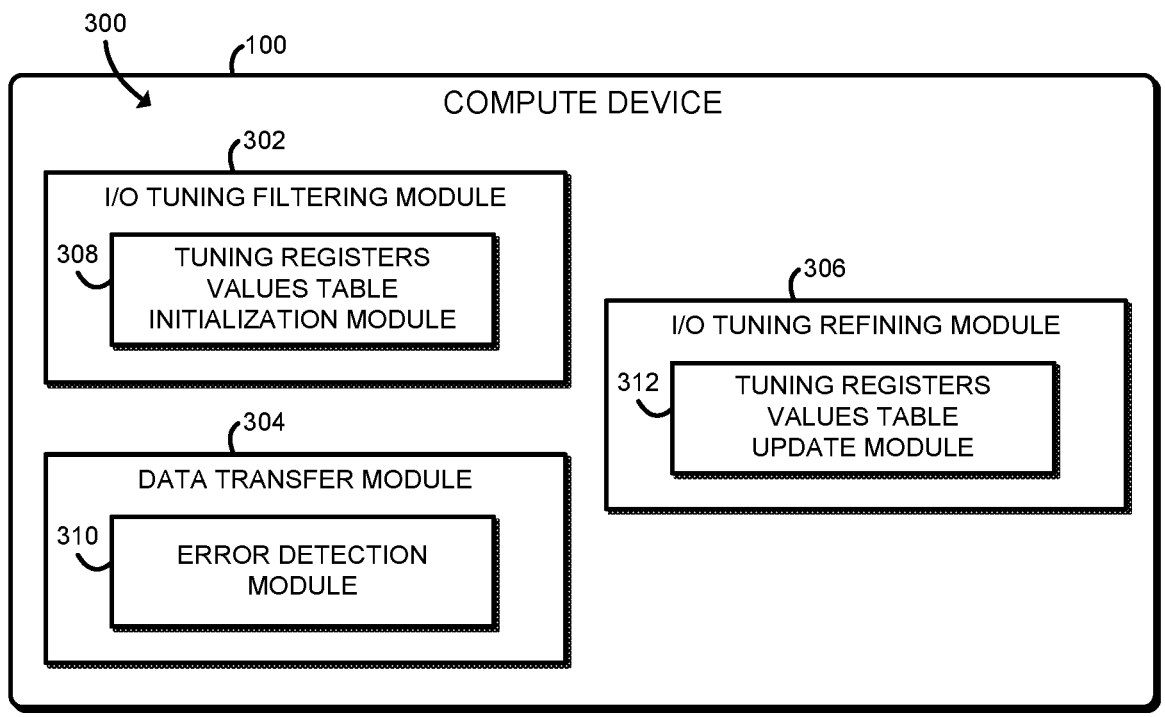
FIG. 3 is a block diagram of at least one embodiment of an environment that may be established by the compute device of FIG. 1.

Referring now to FIG. 3, in use, the compute device 100 may establish an environment 300. The illustrative environment 300 includes an I/O tuning filtering module 302, a data transfer module 304, and an I/O tuning refining module 306. The various modules of the environment 300 may be embodied as hardware, software, firmware, or a combination thereof. For example, the various modules, logic, and other components of the environment 300 may form a portion of, or otherwise be established by, the processor 102 or other hardware components of the compute device 100. As such, in some embodiments, one or more of the modules of the environment 300 may be embodied as circuitry or collection of electrical devices (e.g., an I/O tuning filtering circuit 302, a data transfer circuit 304, an I/O tuning refining circuit 306, etc.). It should be appreciated that, in such embodiments, one or more of the circuits (e.g., the I/O tuning filtering circuit 302, the data transfer circuit 304, the I/O tuning refining circuit 306, etc.) may form a portion of one or more of the processor 102, the memory 104, the I/O subsystem 106, the I/O host controller 108, and/or the data storage 112. Additionally, in some embodiments, one or more of the illustrative modules may form a portion of another module and/or one or more of the illustrative modules may be independent of one another.

The I/O filtering module 302 is configured to determine which tuning registers values sets lead to a successful data transfer operation, and to store those tuning registers sets in the tuning registers values table 210. In the illustrative embodiment, the I/O filtering module 302 attempts a test data transfer for each possible setting of the tuning registers.

In other embodiments, the I/O filtering module 302 may attempt a data transfer with fewer than each possible setting, particularly if there is an unmanageably large number of possible combinations. In such an embodiment, the I/O filtering module 302 may choose a selection of tuning registers values sets for which to attempt a data transfer. A test data transfer is described in more detail below in regard to FIG. 4. Upon a successful test data transfer, a tuning registers values table initialization module 308 of the I/O filtering tuning module 302 adds the corresponding tuning registers values set to the tuning registers values table 210.

The data transfer module 304 is configured to transfer data using the information stored in the tuning registers values table 210. Before beginning a data transfer, the data transfer module 304 selects a tuning registers values set 224 of the tuning registers values table 210 and applies it to the tuning registers 202. In the illustrative embodiment, the data transfer module 304 selects the tuning registers values set 224 that has the highest weight value 226.

The data transfer module 304 includes an error detection module 310, which is configured to determine if a given data transfer is successful. In the illustrative embodiment, each data transfer (including commands) from the I/O host controller 108 to the I/O device 114 includes an error detecting code, such as a parity check, a cyclic redundancy check, or other error detecting code. The I/O device 114 is configured to determine whether the data transfer was performed without an error based on the error detecting code. When an error occurs, the I/O device 114 is configured to notify the I/O host controller, which can be detected by the error detection module 310. Similarly, each illustrative data transfer from the I/O device 114 to the I/O host controller 108 includes an error detecting code. The error detection module 310 is configured to determine whether the data transfer from the I/O device 110 was successful based on the received error detecting code.

In some embodiments, an error detecting code may not be included in every data transfer operation. In such embodiments, the error detection module 310 may be configured to detect errors by, e.g., reading data that was just written to the I/O device 114 and verifying that the data was written correctly. It should be appreciated that, in some embodiments, the error detecting code may include an error correcting code, which may be used to correct an error without resending the corresponding data. In such embodiments, the error detection module 310 may or may not consider a correctable error to be a detected error.

The illustrative I/O tuning refining module 306 is configured to refine the selection of tuning registers values sets 224 in the tuning registers values table 210 and to determine which tunings registers values to use in the event of an error. The illustrative I/O tuning refining module 306 is configured to determine the next tuning registers values set 224 of the tuning registers values table 210 to try based on which set is closest to the current tuning registers values set, as described in more detail below in regard to FIG. 6. If that tuning registers values set 224 does not work, the next set is tried, and so on. Every time a tuning registers values set 224 leads to an unsuccessful data transfer, the tuning registers values table update module 312 of the I/O tuning refining module 306 stores an indication of that failure in the corresponding weight value 226, such as by decrementing the weight value 226. When a tuning registers values set 224 leads to a successful data transfer, the tuning registers values table update module 312 stores an indication of that success in the corresponding weight value 226, such as by incrementing the weight value 226.

Figure 4:
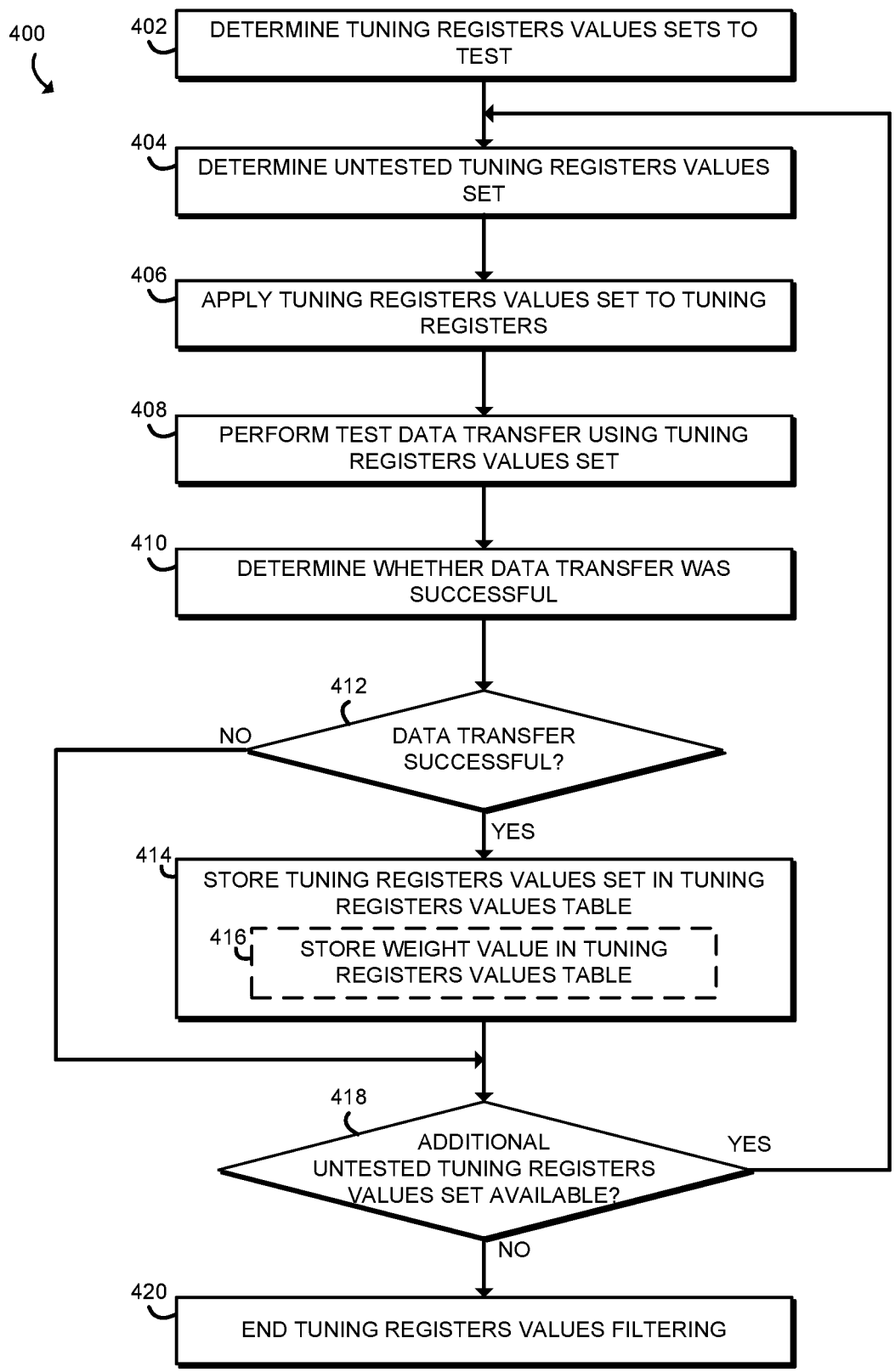
FIG. 4 is a simplified flow diagram of at least one embodiment of a method for filtering tuning registers values that may be executed by the compute device of FIG. 1.

Referring now to FIG. 4, in use, the compute device 100 may execute a method 400 for filtering tuning registers values. The method 400 begins in block 402, in which the compute device 100 determines which tuning registers values sets of all possible tuning registers values sets are to be tested. In the illustrative embodiment, the compute device 100 may test every possible tuning registers values set. In other embodiments, such as ones with a very large number of possible tuning registers values sets, the compute device 100 may not iterate over every possible tuning registers values set, and may choose fewer tuning registers values sets to test. For example, the compute device 100 may choose a relatively small number of possible register values for each tuning register 202, and then test every possible combination of the tuning registers 202 for those register values.

In block 404, the compute device 100 chooses one of the untested tuning registers values sets that are to be tested. The compute device may choose the untested registers values set in any way, such as by starting with the lowest possible value for each register and iterating over every value for every register from smallest to largest. In block 406, the compute device 100 applies the chosen tuning registers values set to the tuning registers 202.

In block 408, the compute device 100 performs a test data transfer using the tuning registers values set. In the illustrative embodiment, the compute device 100 performs both a write operation and a read operation as part of the test data transfer, and will consider the test unsuccessful if either the read or the write operations leads to an error. In some embodiments, the compute device 100 may perform only a write operation or only a read operation as part of the test data transfer, and the test will be considered unsuccessful if that operation leads to an error. It should be appreciated that, if the read operation is the test data transfer, test data may be written to the I/O device 114 prior to the read operation. In some embodiments, the compute device 100 may separately consider the performance of a read operation and a write operation, and store values in the tuning registers values table 210 that should be used for read operations and store values that should be used for write operations.

In the illustrative embodiment, a single test data transfer is performed. In some embodiments, several test data transfers may be performed, and each tuning registers values set that leads to a successful test data transfer for at least a threshold proportion of the test data transfers may be considered successful. The threshold proportion may be any value. For example, in some embodiments, if a single test data transfer out of all of the test data transfers is successful, that proportion may be above the threshold proportion. In other embodiments, if a single test data transfer out of all of the test data transfers is unsuccessful, that proportion may not be above the threshold proportion. An error in a read or write operation may be determined using the error detection module 310 described above.

In block 410, the compute device 100 determines if the test data transfer was successful. In block 412, if the data transfer was not successful, the method 400 jumps to block 418. Otherwise, the method 400 proceeds to block 414.

In block 414, the compute device 100 stores the tuning registers values set in the tuning registers values table 210. In the illustrative embodiment, the corresponding weight value 226 in the tuning registers values table 210 is initialized to a default value, such as zero. In some embodiments, such one in which several test data transfer are performed for each tuning registers values set, the compute device 100 may store a weight value indicating the proportion of the test data transfers that were successful in block 416.

In block 418, if there is an additional untested tuning registers values set that is to be tested that has not yet been tested, the method 400 jumps back to block 404. Otherwise, the method proceeds to block 420, where the tuning registers values filtering stage ends. It should be appreciated that, in certain embodiments, the method 400 described above may be performed at or shortly after the time of manufacture and before sale of the compute device to the end user. In some cases, the compute device 100 used to perform the method 400 may be different from the compute device 100 used to perform the method 500 described below (although the I/O host controller 108 may be the same).

Figure 5:
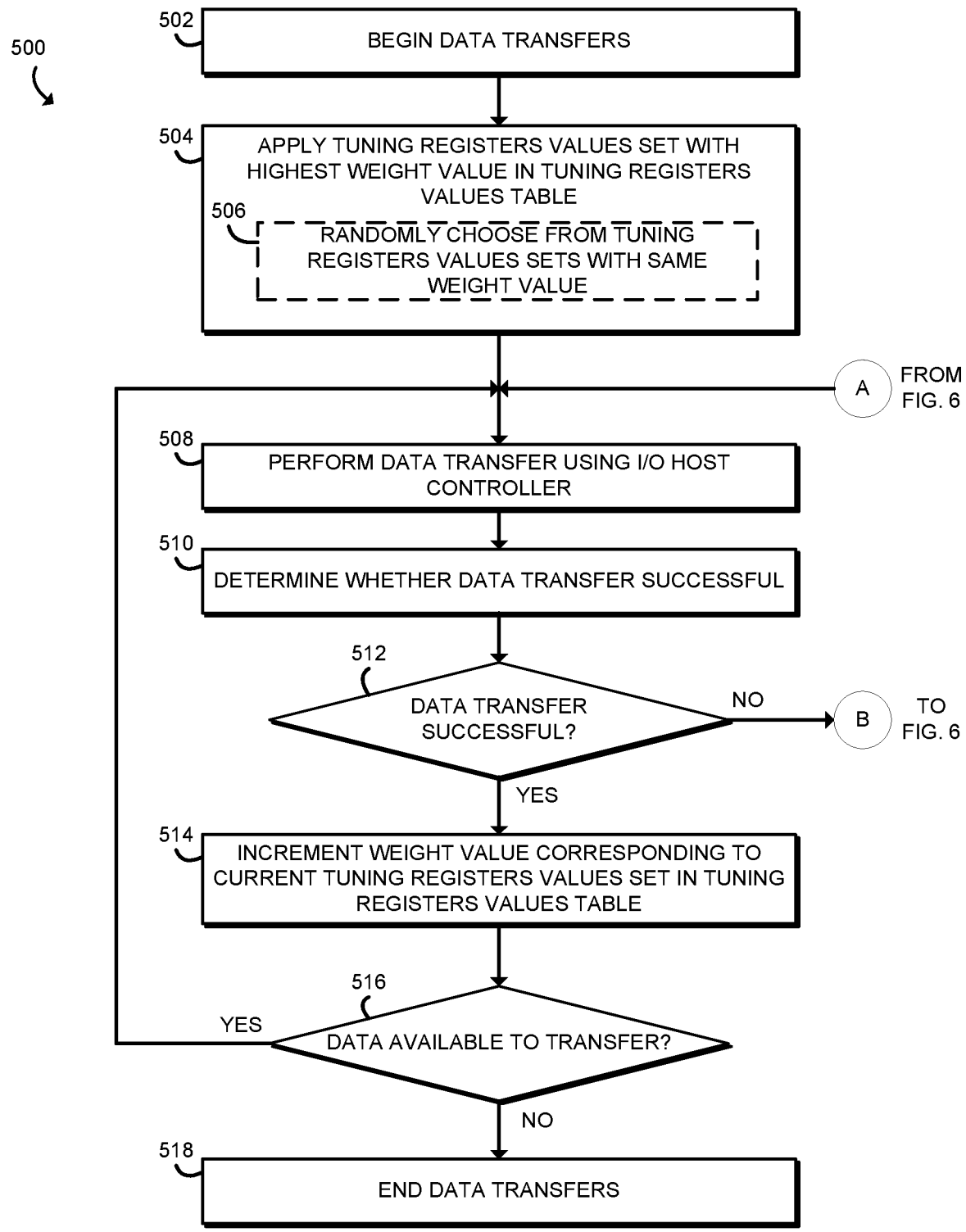
FIGS. 5 and 6 are a simplified flow diagram of at least one embodiment of a method for transferring data that may be executed by the compute device of FIG. 1.

Referring now to FIG. 5, in use, the compute device 100 may execute a method for transferring data between an I/O host controller 108 and an I/O device 114. The method 500 begins in block 502, in which the compute device 100 begins one or more data transfers. The data transfers may be initiated by, e.g., a command from a user, a command from a program running on the compute device 100, a command by the I/O device 114, and/or the like. In the illustrative embodiment, each data transfer is a transfer of a single data block, and all of the data transfers together may transfer, e.g., a single data file. It should be appreciated that the I/O device 114 used in method 500 may be different from the I/O device 114 used in method 400.

In block 504, the compute device 100 applies the tuning registers values set 224 of the tuning registers values table 210 with the highest weight value 226 to the tuning registers 202 of the I/O host controller 108. In embodiments in which more than one tuning registers values set 224 has the same weight value 226, the compute device may randomly choose from the tuning registers values sets 224 with the same weight value 226 in block 506.

In block 508, the compute device 100 performs a data transfer using the I/O host controller 108 with the values of the tuning registers 202 corresponding to the current tuning registers values set 224. In block 510, the compute device 100 determines whether the data transfer was successful. In the illustrative embodiment, the compute device 100 may consider an error detecting code that was sent as part of the data transfer in order to determine whether the data transfer was successful. In other embodiments, the compute device 100 may determine whether there has been an error using other means, as described above in regard to the error detection module 304. In the illustrative embodiment, the data to be transferred is transferred one data block at a time in each iteration of block 510, with each data block having a corresponding error detecting code, and the success of the data transfer is determined based on each single data block and each single error detecting code. In other embodiments, multiple blocks may be transferred with multiple corresponding error detecting codes as part of the data transfer performed in block 510, and the data transfer may be considered successful if the error rate is below a threshold.

Figure 6:
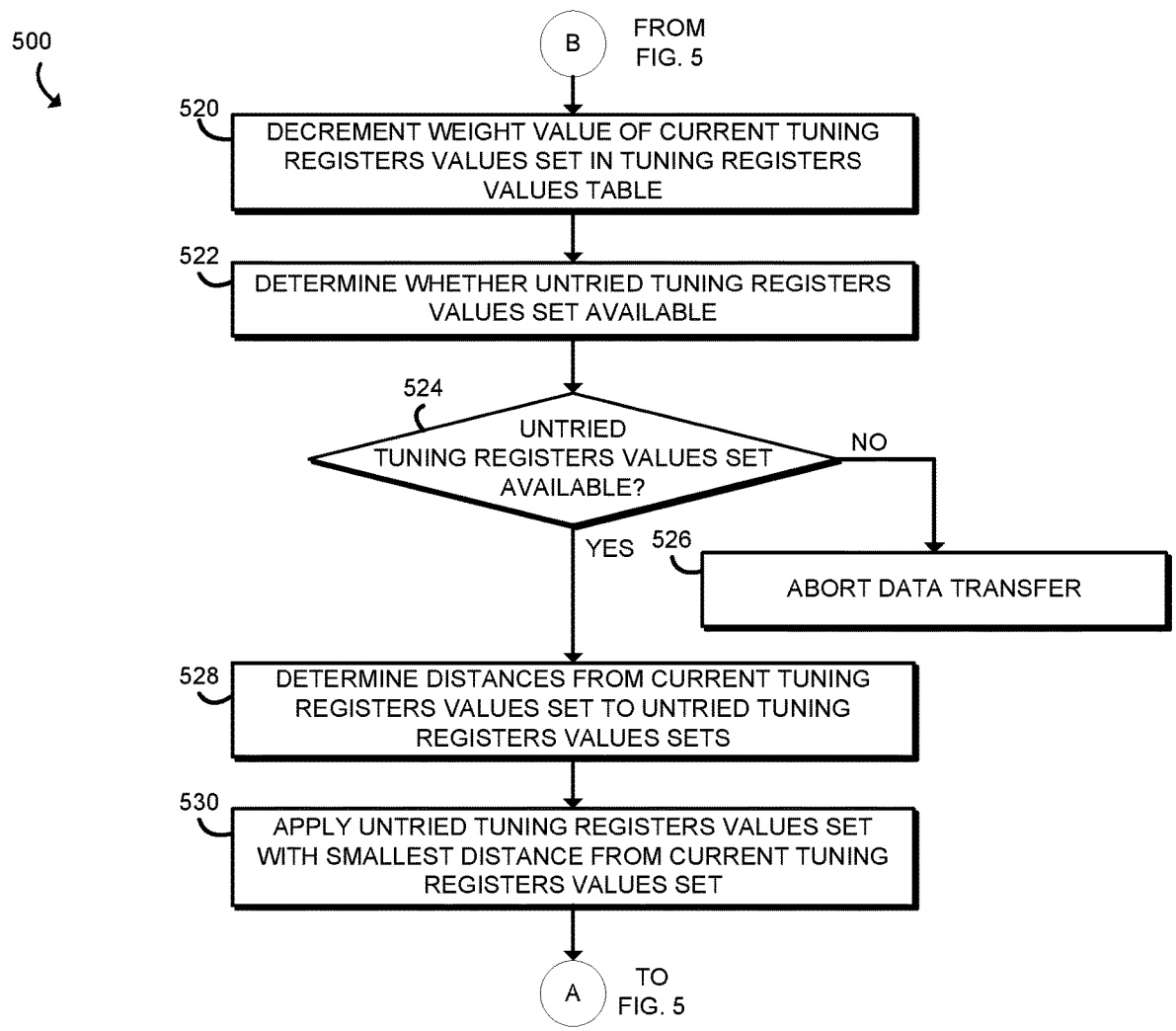

In block 512, if the data transfer was not successful, the method jumps to block 520 in FIG. 6. Otherwise, the method 500 proceeds to block 514. In block 514, the compute device 100 stores an indication that the data transfer was successful in the tuning registers values table 210 corresponding to the current tuning registers values set 224. In the illustrative embodiment, the compute device 100 does so by incrementing the corresponding weight value 226 in the tuning registers values table 210. In the illustrative embodiment, the compute device 100 increments the weight value 226 for each data block that is successfully transferred. In other embodiments, the compute device 100 may not increment the weight value 226 for each data block that is successfully transferred. For example, the compute device 100 may only increment the weight value 226 the first several consecutive data transfers for which the tuning registers values set 224 is used, such as the first 1, 2, 5, or 10 consecutive data transfers, and then not increment the weight value 226 for subsequent consecutive data transfers using the same tuning registers values set 224.

In block 516, if there is additional data available to transfer (e.g., if only some of the data transfers initiated in block 502 have been completed), the method jumps back to block 508. Otherwise, the method proceeds to block 518, in which the data transfers that were begun in block 502 are ended.

Referring back to block 512, if the data transfer is not successful, the method 500 jumps to block 520 in FIG. 6. In block 520, the compute device 100 stores an indication that the data transfer was unsuccessful in the tuning registers values table 210 corresponding to the current tuning registers values set 224. In the illustrative embodiment, the compute device 100 does so by decrementing the corresponding weight value 226 in the tuning registers values table 210.

In block 522, the compute device 100 determines if there are any tuning values registers sets 224 of the tuning values registers table 210 that have not yet been tried during the current data transfer. In block 524, if there are not any untried tuning registers values sets 224, the method proceeds to block 526 in which the compute device 100 aborts the data transfer. Otherwise, the method proceeds to block 528.

In block 528, the compute device 100 determines a distance from the current tuning registers values sets to the untried tuning registers values sets. In the illustrative embodiment, the compute device 100 determines a distance for each of the untried tuning registers values sets, but in other embodiments the compute device 100 may determine a distance for only a subset of all of the untried tuning registers values sets. In some embodiments, the compute device 100 may have pre-determined the distances between the various tuning registers values sets, and may have an indication of the distances stored, e.g., in a look-up table in the tuning registers values table 210.

In the illustrative embodiment, the distance between two tuning registers values sets 224 is determined by comparing how many of the tuning registers values of the two are different. For example, if there are a total of ten tuning registers 202 and each tuning registers values set 224 has ten corresponding values, if a first tuning registers values set 224 has seven values equal to those of a second tuning registers values set 224 and three values that are different, the distance would be three. In other embodiments, the distance between two tuning registers values sets 224 may be determined through other means. For example, the minimum value of each register may be assigned a value of zero, and the maximum value of each register may be assigned a value of one. Each tuning registers values set 224 may then be considered a point in n-dimensional space defined by n values between zero and one, where n is the number of tuning registers values. The distance between two tuning registers values sets may then be determined by calculating the distances between the points in the n-dimensional space.

In block 530, in the illustrative embodiment, the compute device 100 applies to the I/O host controller 108 the untried tuning registers values set 224 with the smallest distance from the current tuning registers values set 224. In some embodiments, the compute device 100 may apply the untried tuning registers values set 224 with the smallest distance from the current tuning registers values set 224 that is also a minimum threshold distance from the current tuning registers values set 224. Additionally or alternatively, the compute device 100 may consider the weight values 226 in choosing which untried tuning registers values set 224 to apply. For example, in some embodiments, the compute device 100 may apply the untried tuning registers values set 224 having the highest corresponding weight value 226. After block 530, the method 500 returns to block 508 in FIG. 6 to perform any additional data transfers. It should be appreciated that, in some embodiments, the blocks of the methods 400 and 500 may be performed by software running on the compute device 100 such as a device driver, by firmware of the I/O host controller 108, and/or by a combination of both.

EXAMPLES

Illustrative examples of the devices, systems, and methods disclosed herein are provided below. An embodiment of the devices, systems, and methods may include any one or more, and any combination of, the examples described below.

Example 1 includes a compute device for transferring data comprising an I/O host controller comprising one or more tuning registers; an I/O tuning filtering module to determine a plurality of tuning registers values sets, wherein each tuning registers values set indicates a setting for each of the one or more tuning registers; apply, for each of the plurality of tuning registers values sets, the corresponding tuning registers values set to the one or more tuning registers; perform, for each of the plurality of tuning registers values sets, a test data transfer between the compute device and a first I/O device using the I/O host controller with the corresponding tuning registers values set; determine, for each of the plurality of tuning registers values sets, whether the corresponding test data transfer was successful; and store, in a tuning registers values table of the compute device, an indication for each of at least two tuning registers values sets of the plurality of tuning registers values sets in response to a determination that the corresponding test data transfer of each of the at least two tuning registers values sets was successful.

Example 2 includes the subject matter of Example 1, and further including a data transfer module to apply a first tuning registers values set of the at least two tuning registers values sets to the I/O host controller; perform a first data transfer between the compute device and a second I/O device using the I/O host controller with the first tuning registers values set; and determine whether the first data transfer was successful; and an I/O tuning refining module to update the tuning registers values table in response to a determination that the first data transfer was not successful; and apply, in response to the determination that the first data transfer was not successful, a second tuning registers values set of the at least two tuning registers values sets to the I/O host controller; wherein the data transfer module is further to perform, in response to the determination that the first data transfer was not successful, a second data transfer between the compute device and the second I/O device using the I/O host controller with the second tuning registers values set; and determine whether the second data transfer was successful, and wherein the I/O tuning refining module is further to update the tuning registers values table in response to a determination that the second data transfer was successful.

Example 3 includes the subject matter of any of Examples 1 and 2, and wherein the first I/O device is different from the second I/O device.

Example 4 includes the subject matter of any of Examples 1-3, and wherein the tuning registers values table comprises a plurality of weight values, wherein each of the plurality of weight values corresponds to one of the tuning registers values sets of the at least two tuning registers values sets, wherein each weight value of the plurality of weight values indicates a past performance of one or more past data transfers using the corresponding tuning registers values set, wherein the one or more past data transfers are different from the corresponding test data transfer, wherein to apply the first tuning registers values set of the at least two tuning registers values sets comprises to select, based on the plurality of weight values, the first tuning registers values set.

Example 5 includes the subject matter of any of Examples 1-4, and wherein to select, based on the plurality of weight values, the first tuning registers values set comprises to determine whether the first tuning registers values set has the highest weight value of the plurality of weight values, and select the first tuning registers values set based on a determination that the first tuning registers values set has the highest weight value of the plurality of weight values.

Example 6 includes the subject matter of any of Examples 1-5, and wherein the I/O tuning refining module is further to update, in response to the determination that the first data transfer was not successful, the weight value of the plurality of weight values corresponding to the first tuning registers values set; and update, in response to the determination that the second data transfer was successful, the weight value of the plurality of weight values corresponding to the second tuning registers values set.

Example 7 includes the subject matter of any of Examples 1-6, and wherein to update the weight value corresponding to the first tuning registers value set comprises to decrement the weight value corresponding to the first tuning registers values set, and wherein to update the weight value corresponding to the second tuning registers value set comprises to increment the weight value corresponding to the second tuning registers values set.

Example 8 includes the subject matter of any of Examples 1-7, and wherein to apply the second tuning registers values set comprises to determine a plurality of distance parameters, wherein each of the plurality of distance parameters indicates a distance to a corresponding tuning registers values set of the at least two tuning registers values sets from the first tuning registers values set; determine whether the second tuning registers values set has the corresponding smallest distance parameter of the plurality of distance parameters; and apply, based on a determination that the second tuning registers values set has the corresponding smallest distance parameter, the second tuning registers values set to the I/O host controller.

Example 9 includes the subject matter of any of Examples 1-8, and wherein the distance from the first tuning registers values set to the corresponding tuning registers values set of the at least two tuning registers values sets indicates a number of values of the corresponding tuning registers values set different from the first tuning registers values set.

Example 10 includes the subject matter of any of Examples 1-9, and wherein to apply the second tuning registers values set comprises to select, based on the plurality of weight values, the second tuning registers values set.

Example 11 includes the subject matter of any of Examples 1-10, and wherein to store, in the tuning registers values table, an indication of the at least two tuning registers values sets of the plurality of tuning registers values sets for which the test data transfer was successful comprises to store, in the tuning registers values table, each tuning registers values set for which the test data transfer was successful.

Example 12 includes the subject matter of any of Examples 1-11, and wherein the I/O host controller is an SDIO host controller.

Example 13 includes the subject matter of any of Examples 1-12, and wherein the I/O host controller is a USB host controller.

Example 14 includes the subject matter of any of Examples 1-13, and wherein to determine whether the corresponding test data transfer was successful comprises to perform a cyclic redundancy check.

Example 15 includes the subject matter of any of Examples 1-14, and wherein the one or more tuning registers comprise one or more edge sampling registers, wherein the one or more edge sampling registers indicate whether the I/O host controller is to read one or more I/O pins of the I/O host controller at a rising edge of a clock signal of the I/O host device or at a falling edge of the clock signal, and wherein each of the plurality of tuning registers values sets includes one or more edge sampling registers values.

Example 16 includes the subject matter of any of Examples 1-15, and wherein the one or more edge sampling registers comprise a single edge sampling register, wherein the single edge sampling register indicates whether the I/O host controller is to read each of the one or more I/O pins on the rising edge or the falling edge, and wherein each of the plurality of tuning registers values sets includes a single edge sampling register value.

Example 17 includes the subject matter of any of Examples 1-16, and wherein the one or more edge sampling registers comprise a plurality of edge sampling registers, wherein each of the plurality of edge sampling registers indicates, for a corresponding I/O pin of the one or more I/O pins, whether the I/O host controller is to read the corresponding I/O pin on the rising edge or the falling edge, and wherein each of the plurality of tuning registers values sets includes a plurality of edge sampling registers values.

Example 18 includes the subject matter of any of Examples 1-17, and wherein to apply, for each of the plurality of tuning registers values sets, the corresponding tuning registers values set comprises to apply, for each of the plurality of tuning registers values sets, the one or more edge sampling registers values to the one or more edge sampling registers, and wherein to perform, for each of the plurality of tuning registers values sets, the test data transfer comprises to read, for each of the plurality of tuning registers values sets, the one or more I/O pins with the corresponding one or more edge sampling register values.

Example 19 includes the subject matter of any of Examples 1-18, and wherein the one or more tuning registers comprise one or more write delay tuning registers, wherein the one or more write delay tuning registers indicate one or more temporal write delays that the I/O host controller is to use to write to one or more I/O pins of the I/O host controller, and wherein each of the plurality of tuning registers values sets includes one or more write delay tuning registers values.

Example 20 includes the subject matter of any of Examples 1-19, and wherein the one or more write delay tuning registers comprise a single write delay tuning register, wherein the single write delay tuning register indicates a single temporal write delay that the I/O host controller is to use to write to each of the one or more I/O pins, and wherein each of the plurality of tuning registers values sets includes a single write delay registers value.

Example 21 includes the subject matter of any of Examples 1-20, and wherein the one or more write delay tuning registers comprise a plurality of write delay tuning registers, wherein each of the plurality of write delay tuning registers indicates, for a corresponding I/O pin of the one or more I/O pins, a corresponding temporal write delay that the I/O host controller is to use to write to the corresponding I/O pin, and wherein each of the plurality of tuning registers values includes a plurality of write delay registers values.

Example 22 includes the subject matter of any of Examples 1-21, and wherein to apply, for each of the plurality of tuning registers values sets, the corresponding tuning registers values set comprises to apply, for each of the plurality of tuning registers values sets, the one or more write delay tuning registers values to the one or more write delay tuning registers, and wherein to perform, for each of the plurality of tuning registers values sets, the test data transfer comprises to write, for each of the plurality of tuning registers values sets, the one or more I/O pins with the corresponding one or more write delay tuning registers values.

Example 23 includes the subject matter of any of Examples 1-22, and wherein the one or more tuning registers comprise one or more read delay tuning registers, wherein the one or more read delay tuning registers indicate one or more temporal read delays that the I/O host controller is to use to read from one or more I/O pins of the I/O host controller, and wherein each of the plurality of tuning registers values sets includes one or more read delay tuning registers values.

Example 24 includes the subject matter of any of Examples 1-23, and wherein the one or more read delay tuning registers comprise a single read delay tuning register, wherein the single read delay tuning register indicates a single temporal read delay that the I/O host controller is to use to read from each of the one or more I/O pins, and wherein each of the plurality of tuning registers values sets includes a single read delay registers value.

Example 25 includes the subject matter of any of Examples 1-24, and wherein the one or more read delay tuning registers comprise a plurality of read delay tuning registers, wherein each of the plurality of read delay tuning registers indicates, for a corresponding I/O pin of the one or more I/O pins, a corresponding temporal read delay that the I/O host controller is to use to read from the corresponding I/O pin, and wherein each of the plurality of tuning registers values includes a plurality of read delay registers values.

Example 26 includes the subject matter of any of Examples 1-25, and wherein to apply, for each of the plurality of tuning registers values sets, the corresponding tuning registers values set comprises to apply, for each of the plurality of tuning registers values sets, the one or more read delay tuning registers values to the one or more read delay tuning registers, and wherein to perform, for each of the plurality of tuning registers values sets, the test data transfer comprises to read, for each of the plurality of tuning registers values sets, the one or more I/O pins with the corresponding one or more read delay tuning registers values.

Example 27 includes the subject matter of any of Examples 1-26, and wherein the one or more tuning registers comprise one or more I/O pin characteristics registers, wherein the one or more I/O pin characteristics registers indicate one or more termination impedances to be used for one or more I/O pins of the I/O host controller, and wherein each of the plurality of tuning registers values sets includes one or more I/O pin characteristics registers values.

Example 28 includes the subject matter of any of Examples 1-27, and wherein the one or more I/O pin characteristics registers comprise a single I/O pin characteristics register, wherein the single I/O pin characteristics register indicates a single termination impedance to be used for each of the one or more I/O pins, and wherein each of the plurality of tuning registers values sets includes a single I/O pin characteristics register value.

Example 29 includes the subject matter of any of Examples 1-28, and wherein the one or more I/O pin characteristics registers comprise a plurality of I/O pin characteristics registers, wherein each of the plurality of I/O pin characteristics registers indicates a corresponding termination impedance to be used for a corresponding I/O pin of the one or more I/O pins, and wherein each of the plurality of tuning registers values includes a plurality of I/O pin characteristics registers values.

Example 30 includes the subject matter of any of Examples 1-29, and wherein to apply, for each of the plurality of tuning registers values sets, the corresponding tuning registers values set comprises to apply, for each of the plurality of tuning registers values sets, the one or more I/O pin characteristics registers values to the one or more I/O pin characteristics registers, and wherein to perform, for each of the plurality of tuning registers values sets, the test data transfer comprises to read, for each of the plurality of tuning registers values sets, the one or more I/O pins with the corresponding one or more I/O pin characteristics registers values.

Example 31 includes a method of transferring data by a compute device with an I/O host controller, the method comprising determining, by the compute device, a plurality of tuning registers values sets, wherein each tuning registers values set indicates a setting for one or more tuning registers of the I/O host controller of the compute device; applying, by the compute device and for each of the plurality of tuning registers values sets, the corresponding tuning registers values set to the one or more tuning registers; performing, by the compute device and for each of the plurality of tuning registers values sets, a test data transfer between the compute device and a first I/O device using the I/O host controller with the corresponding tuning registers values set; determining, by the compute device and for each of the plurality of tuning registers values sets, whether the corresponding test data transfer was successful; and storing, by the compute device and in a tuning registers values table of the compute device, an indication for each of at least two tuning registers values sets of the plurality of tuning registers values sets in response to a determination that the corresponding test data transfer of each of the at least two tuning registers values sets was successful.

Example 32 includes the subject matter of Example 31, and further including applying, by the compute device, a first tuning registers values set of the at least two tuning registers values sets to the I/O host controller; performing, by the compute device, a first data transfer between the compute device and a second I/O device using the I/O host controller with the first tuning registers values set; determining, by the compute device, whether the first data transfer was successful; updating, by the compute device, the tuning registers values table in response to a determination that the first data transfer was not successful; applying, by the compute device and in response to the determination that the first data transfer was not successful, a second tuning registers values set of the at least two tuning registers values sets to the I/O host controller; performing, by the compute device and in response to the determination that the first data transfer was not successful, a second data transfer between the compute device and the second I/O device using the I/O host controller with the second tuning registers values set; determining, by the compute device, whether the second data transfer was successful; and updating, by the compute device, the tuning registers values table in response to a determination that the second data transfer was successful.

Example 33 includes the subject matter of any of Examples 31 and 32, and wherein the first I/O device is different from the second I/O device.

Example 34 includes the subject matter of any of Examples 31-33, and wherein the tuning registers values table comprises a plurality of weight values, wherein each of the plurality of weight values corresponds to one of the tuning registers values sets of the at least two tuning registers values sets, wherein each weight value of the plurality of weight values indicates a past performance of one or more past data transfers using the corresponding tuning registers values set, wherein the one or more past data transfers are different from the corresponding test data transfer, wherein applying the first tuning registers values set of the at least two tuning registers values sets comprises selecting, by the compute device and based on the plurality of weight values, the first tuning registers values set.

Example 35 includes the subject matter of any of Examples 31-34, and wherein selecting, based on the plurality of weight values, the first tuning registers values set comprises determining, by the compute device, whether the first tuning registers values set has the highest weight value of the plurality of weight values, and selecting, by the compute device, the first tuning registers values set based on a determination that the first tuning registers values set has the highest weight value of the plurality of weight values.

Example 36 includes the subject matter of any of Examples 31-35, and further including updating, in response to the determination that the first data transfer was not successful, the weight value of the plurality of weight values corresponding to the first tuning registers values set; and updating, in response to the determination that the second data transfer was successful, the weight value of the plurality of weight values corresponding to the second tuning registers values set.

Example 37 includes the subject matter of any of Examples 31-36, and wherein updating the weight value corresponding to the first tuning registers value set comprises decrementing the weight value corresponding to the first tuning registers values set, and wherein updating the weight value corresponding to the second tuning registers value set comprises incrementing the weight value corresponding to the second tuning registers values set.

Example 38 includes the subject matter of any of Examples 31-37, and wherein applying the second tuning registers values set comprises determining, by the compute device, a plurality of distance parameters, wherein each of the plurality of distance parameters indicates a distance to a corresponding tuning registers values set of the at least two tuning registers values sets from the first tuning registers values set; determining, by the compute device, whether the second tuning registers values set has the corresponding smallest distance parameter of the plurality of distance parameters; and applying, by the compute device and based on a determination that the second tuning registers values set has the corresponding smallest distance parameter, the second tuning registers values set to the I/O host controller.

Example 39 includes the subject matter of any of Examples 31-38, and wherein the distance from the first tuning registers values set to the corresponding tuning registers values set of the at least two tuning registers values sets indicates a number of values of the corresponding tuning registers values set different from the first tuning registers values set.

Example 40 includes the subject matter of any of Examples 31-39, and wherein applying the second tuning registers values set comprises selecting, by the compute device and based on the plurality of weight values, the second tuning registers values set.

Example 41 includes the subject matter of any of Examples 31-40, and wherein storing, in the tuning registers values table, an indication of the at least two tuning registers values sets of the plurality of tuning registers values sets for which the test data transfer was successful comprises storing, in the tuning registers values table, each tuning registers values set for which the test data transfer was successful.

Example 42 includes the subject matter of any of Examples 31-41, and wherein the I/O host controller is an SDIO host controller.

Example 43 includes the subject matter of any of Examples 31-42, and wherein the I/O host controller is a USB host controller.

Example 44 includes the subject matter of any of Examples 31-43, and wherein determining whether the corresponding test data transfer was successful comprises performing a cyclic redundancy check.

Example 45 includes the subject matter of any of Examples 31-44, and wherein the one or more tuning registers comprise one or more edge sampling registers, wherein the one or more edge sampling registers indicate whether the I/O host controller is to read one or more I/O pins of the I/O host controller at a rising edge of a clock signal of the I/O host device or at a falling edge of the clock signal, and wherein each of the plurality of tuning registers values sets includes one or more edge sampling registers values.

Example 46 includes the subject matter of any of Examples 31-45, and wherein the one or more edge sampling registers comprise a single edge sampling register, wherein the single edge sampling register indicates whether the I/O host controller is to read each of the one or more I/O pins on the rising edge or the falling edge, and wherein each of the plurality of tuning registers values sets includes a single edge sampling register value.

Example 47 includes the subject matter of any of Examples 31-46, and wherein the one or more edge sampling registers comprise a plurality of edge sampling registers, wherein each of the plurality of edge sampling registers indicates, for a corresponding I/O pin of the one or more I/O pins, whether the I/O host controller is to read the corresponding I/O pin on the rising edge or the falling edge, and wherein each of the plurality of tuning registers values sets includes a plurality of edge sampling registers values.

Example 48 includes the subject matter of any of Examples 31-47, and wherein applying, for each of the plurality of tuning registers values sets, the corresponding tuning registers values set comprises applying, for each of the plurality of tuning registers values sets, the one or more edge sampling registers values to the one or more edge sampling registers, and wherein performing, for each of the plurality of tuning registers values sets, the test data transfer comprises reading, by the compute device and for each of the plurality of tuning registers values sets, the one or more I/O pins with the corresponding one or more edge sampling register values.

Example 49 includes the subject matter of any of Examples 31-48, and wherein the one or more tuning registers comprise one or more write delay tuning registers, wherein the one or more write delay tuning registers indicate one or more temporal write delays that the I/O host controller is to use to write to one or more I/O pins of the I/O host controller, and wherein each of the plurality of tuning registers values sets includes one or more write delay tuning registers values.

Example 50 includes the subject matter of any of Examples 31-49, and wherein the one or more write delay tuning registers comprise a single write delay tuning register, wherein the single write delay tuning register indicates a single temporal write delay that the I/O host controller is to use to write to each of the one or more I/O pins, and wherein each of the plurality of tuning registers values sets includes a single write delay registers value.

Example 51 includes the subject matter of any of Examples 31-50, and wherein the one or more write delay tuning registers comprise a plurality of write delay tuning registers, wherein each of the plurality of write delay tuning registers indicates, for a corresponding I/O pin of the one or more I/O pins, a corresponding temporal write delay that the I/O host controller is to use to write to the corresponding I/O pin, and wherein each of the plurality of tuning registers values includes a plurality of write delay registers values.

Example 52 includes the subject matter of any of Examples 31-51, and wherein applying, for each of the plurality of tuning registers values sets, the corresponding tuning registers values set comprises applying, for each of the plurality of tuning registers values sets, the one or more write delay tuning registers values to the one or more write delay tuning registers, and wherein performing, for each of the plurality of tuning registers values sets, the test data transfer comprises writing, by the compute device and for each of the plurality of tuning registers values sets, the one or more I/O pins with the corresponding one or more write delay tuning registers values.

Example 53 includes the subject matter of any of Examples 31-52, and wherein the one or more tuning registers comprise one or more read delay tuning registers, wherein the one or more read delay tuning registers indicate one or more temporal read delays that the I/O host controller is to use to read from one or more I/O pins of the I/O host controller, and wherein each of the plurality of tuning registers values sets includes one or more read delay tuning registers values.

Example 54 includes the subject matter of any of Examples 31-53, and wherein the one or more read delay tuning registers comprise a single read delay tuning register, wherein the single read delay tuning register indicates a single temporal read delay that the I/O host controller is to use to read from each of the one or more I/O pins, and wherein each of the plurality of tuning registers values sets includes a single read delay registers value.

Example 55 includes the subject matter of any of Examples 31-54, and wherein the one or more read delay tuning registers comprise a plurality of read delay tuning registers, wherein each of the plurality of read delay tuning registers indicates, for a corresponding I/O pin of the one or more I/O pins, a corresponding temporal read delay that the I/O host controller is to use to read from the corresponding I/O pin, and wherein each of the plurality of tuning registers values includes a plurality of read delay registers values Example 56 includes the subject matter of any of Examples 31-55, and wherein applying, for each of the plurality of tuning registers values sets, the corresponding tuning registers values set comprises applying, for each of the plurality of tuning registers values sets, the one or more read delay tuning registers values to the one or more read delay tuning registers, and wherein performing, for each of the plurality of tuning registers values sets, the test data transfer comprises reading, by the compute device and for each of the plurality of tuning registers values sets, the one or more I/O pins with the corresponding one or more read delay tuning registers values.

Example 57 includes the subject matter of any of Examples 31-56, and wherein the one or more tuning registers comprise one or more I/O pin characteristics registers, wherein the one or more I/O pin characteristics registers indicate one or more termination impedances to be used for one or more I/O pins of the I/O host controller, and wherein each of the plurality of tuning registers values sets includes one or more I/O pin characteristics registers values.

Example 58 includes the subject matter of any of Examples 31-57, and wherein the one or more I/O pin characteristics registers comprise a single I/O pin characteristics register, wherein the single I/O pin characteristics register indicates a single termination impedance to be used for each of the one or more I/O pins, and wherein each of the plurality of tuning registers values sets includes a single I/O pin characteristics register value.

Example 59 includes the subject matter of any of Examples 31-58, and wherein the one or more I/O pin characteristics registers comprise a plurality of I/O pin characteristics registers, wherein each of the plurality of I/O pin characteristics registers indicates a corresponding termination impedance to be used for a corresponding I/O pin of the one or more I/O pins, and wherein each of the plurality of tuning registers values includes a plurality of I/O pin characteristics registers values.

Example 60 includes the subject matter of any of Examples 31-59, and wherein applying, for each of the plurality of tuning registers values sets, the corresponding tuning registers values set comprises applying, for each of the plurality of tuning registers values sets, the one or more I/O pin characteristics registers values to the one or more I/O pin characteristics registers, and wherein performing, for each of the plurality of tuning registers values sets, the test data transfer comprises reading, by the compute device and for each of the plurality of tuning registers values sets, the one or more I/O pins with the corresponding one or more I/O pin characteristics registers values.

Example 61 includes one or more machine-readable media comprising a plurality of instructions stored thereon that, in response to being executed, result in a compute device performing the method of any of Examples 31-60.

Example 62 includes a compute device for transferring data with an I/O host controller comprising means for determining a plurality of tuning registers values sets, wherein each tuning registers values set indicates a setting for one or more tuning registers of the I/O host controller of the compute device; means for applying, for each of the plurality of tuning registers values sets, the corresponding tuning registers values set to the one or more tuning registers; means for performing, for each of the plurality of tuning registers values sets, a test data transfer between the compute device and a first I/O device using the I/O host controller with the corresponding tuning registers values set; means for determining, for each of the plurality of tuning registers values sets, whether the corresponding test data transfer was successful; and means for storing, in a tuning registers values table of the compute device, an indication for each of at least two tuning registers values sets of the plurality of tuning registers values sets in response to a determination that the corresponding test data transfer of each of the at least two tuning registers values sets was successful.

Example 63 includes the subject matter of Example 62, and further including means for applying a first tuning registers values set of the at least two tuning registers values sets to the I/O host controller; means for performing a first data transfer between the compute device and a second I/O device using the I/O host controller with the first tuning registers values set; means for determining whether the first data transfer was successful; means for updating the tuning registers values table in response to a determination that the first data transfer was not successful; means for applying, in response to the determination that the first data transfer was not successful, a second tuning registers values set of the at least two tuning registers values sets to the I/O host controller; means for performing, in response to the determination that the first data transfer was not successful, a second data transfer between the compute device and the second I/O device using the I/O host controller with the second tuning registers values set; means for determining whether the second data transfer was successful; and means for updating the tuning registers values table in response to a determination that the second data transfer was successful.

Example 64 includes the subject matter of any of Examples 62 and 63, and wherein the first I/O device is different from the second I/O device.

Example 65 includes the subject matter of any of Examples 62-64, and wherein the tuning registers values table comprises a plurality of weight values, wherein each of the plurality of weight values corresponds to one of the tuning registers values sets of the at least two tuning registers values sets, wherein each weight value of the plurality of weight values indicates a past performance of one or more past data transfers using the corresponding tuning registers values set, wherein the one or more past data transfers are different from the corresponding test data transfer, wherein the means for applying the first tuning registers values set of the at least two tuning registers values sets comprises means for selecting, based on the plurality of weight values, the first tuning registers values set.

Example 66 includes the subject matter of any of Examples 62-65, and wherein the means for selecting, based on the plurality of weight values, the first tuning registers values set comprises means for determining whether the first tuning registers values set has the highest weight value of the plurality of weight values, and means for selecting the first tuning registers values set based on a determination that the first tuning registers values set has the highest weight value of the plurality of weight values.

Example 67 includes the subject matter of any of Examples 62-66, and further including means for updating, in response to the determination that the first data transfer was not successful, the weight value of the plurality of weight values corresponding to the first tuning registers values set; and means for updating, in response to the determination that the second data transfer was successful, the weight value of the plurality of weight values corresponding to the second tuning registers values set.

Example 68 includes the subject matter of any of Examples 62-67, and, wherein the means for updating the weight value corresponding to the first tuning registers value set comprises means for decrementing the weight value corresponding to the first tuning registers values set, and wherein the means for updating the weight value corresponding to the second tuning registers value set comprises means for incrementing the weight value corresponding to the second tuning registers values set.

Example 69 includes the subject matter of any of Examples 62-68, and wherein the means for applying the second tuning registers values set comprises means for determining a plurality of distance parameters, wherein each of the plurality of distance parameters indicates a distance to a corresponding tuning registers values set of the at least two tuning registers values sets from the first tuning registers values set; means for determining whether the second tuning registers values set has the corresponding smallest distance parameter of the plurality of distance parameters; and means for applying, based on a determination that the second tuning registers values set has the corresponding smallest distance parameter, the second tuning registers values set to the I/O host controller.

Example 70 includes the subject matter of any of Examples 62-69, and wherein the distance from the first tuning registers values set to the corresponding tuning registers values set of the at least two tuning registers values sets indicates a number of values of the corresponding tuning registers values set different from the first tuning registers values set.

Example 71 includes the subject matter of any of Examples 62-70, and wherein the means for applying the second tuning registers values set comprises means for selecting, based on the plurality of weight values, the second tuning registers values set.

Example 72 includes the subject matter of any of Examples 62-71, and wherein the means for storing, in the tuning registers values table, an indication of the at least two tuning registers values sets of the plurality of tuning registers values sets for which the test data transfer was successful comprises means for storing, in the tuning registers values table, each tuning registers values set for which the test data transfer was successful.

Example 73 includes the subject matter of any of Examples 62-72, and wherein the I/O host controller is an SDIO host controller.

Example 74 includes the subject matter of any of Examples 62-73, and wherein the I/O host controller is a USB host controller.

Example 75 includes the subject matter of any of Examples 62-74, and wherein the means for determining whether the corresponding test data transfer was successful comprises means for performing a cyclic redundancy check.

Example 76 includes the subject matter of any of Examples 62-75, and wherein the one or more tuning registers comprise one or more edge sampling registers, wherein the one or more edge sampling registers indicate whether the I/O host controller is to read one or more I/O pins of the I/O host controller at a rising edge of a clock signal of the I/O host device or at a falling edge of the clock signal, and wherein each of the plurality of tuning registers values sets includes one or more edge sampling registers values.

Example 77 includes the subject matter of any of Examples 62-76, and wherein the one or more edge sampling registers comprise a single edge sampling register, wherein the single edge sampling register indicates whether the I/O host controller is to read each of the one or more I/O pins on the rising edge or the falling edge, and wherein each of the plurality of tuning registers values sets includes a single edge sampling register value.

Example 78 includes the subject matter of any of Examples 62-77, and wherein the one or more edge sampling registers comprise a plurality of edge sampling registers, wherein each of the plurality of edge sampling registers indicates, for a corresponding I/O pin of the one or more I/O pins, whether the I/O host controller is to read the corresponding I/O pin on the rising edge or the falling edge, and wherein each of the plurality of tuning registers values sets includes a plurality of edge sampling registers values.

Example 79 includes the subject matter of any of Examples 62-78, and wherein the means for applying, for each of the plurality of tuning registers values sets, the corresponding tuning registers values set comprises means for applying, for each of the plurality of tuning registers values sets, the one or more edge sampling registers values to the one or more edge sampling registers, and wherein the means for performing, for each of the plurality of tuning registers values sets, the test data transfer comprises means for reading, for each of the plurality of tuning registers values sets, the one or more I/O pins with the corresponding one or more edge sampling register values.

Example 80 includes the subject matter of any of Examples 62-79, and wherein the one or more tuning registers comprise one or more write delay tuning registers, wherein the one or more write delay tuning registers indicate one or more temporal write delays that the I/O host controller is to use to write to one or more I/O pins of the I/O host controller, and wherein each of the plurality of tuning registers values sets includes one or more write delay tuning registers values.

Example 81 includes the subject matter of any of Examples 62-80, and wherein the one or more write delay tuning registers comprise a single write delay tuning register, wherein the single write delay tuning register indicates a single temporal write delay that the I/O host controller is to use to write to each of the one or more I/O pins, and wherein each of the plurality of tuning registers values sets includes a single write delay registers value.

Example 82 includes the subject matter of any of Examples 62-81, and wherein the one or more write delay tuning registers comprise a plurality of write delay tuning registers, wherein each of the plurality of write delay tuning registers indicates, for a corresponding I/O pin of the one or more I/O pins, a corresponding temporal write delay that the I/O host controller is to use to write to the corresponding I/O pin, and wherein each of the plurality of tuning registers values includes a plurality of write delay registers values.

Example 83 includes the subject matter of any of Examples 62-82, and wherein the means for applying, for each of the plurality of tuning registers values sets, the corresponding tuning registers values set comprises means for applying, for each of the plurality of tuning registers values sets, the one or more write delay tuning registers values to the one or more write delay tuning registers, and wherein means for performing, for each of the plurality of tuning registers values sets, the test data transfer comprises means for writing, for each of the plurality of tuning registers values sets, the one or more I/O pins with the corresponding one or more write delay tuning registers values.

Example 84 includes the subject matter of any of Examples 62-83, and wherein the one or more tuning registers comprise one or more read delay tuning registers, wherein the one or more read delay tuning registers indicate one or more temporal read delays that the I/O host controller is to use to read from one or more I/O pins of the I/O host controller, and wherein each of the plurality of tuning registers values sets includes one or more read delay tuning registers values.

Example 85 includes the subject matter of any of Examples 62-84, and wherein the one or more read delay tuning registers comprise a single read delay tuning register, wherein the single read delay tuning register indicates a single temporal read delay that the I/O host controller is to use to read from each of the one or more I/O pins, and wherein each of the plurality of tuning registers values sets includes a single read delay registers value.

Example 86 includes the subject matter of any of Examples 62-85, and, wherein the one or more read delay tuning registers comprise a plurality of read delay tuning registers, wherein each of the plurality of read delay tuning registers indicates, for a corresponding I/O pin of the one or more I/O pins, a corresponding temporal read delay that the I/O host controller is to use to read from the corresponding I/O pin, and wherein each of the plurality of tuning registers values includes a plurality of read delay registers values Example 87 includes the subject matter of any of Examples 62-86, and wherein the means for applying, for each of the plurality of tuning registers values sets, the corresponding tuning registers values set comprises means for applying, for each of the plurality of tuning registers values sets, the one or more read delay tuning registers values to the one or more read delay tuning registers, and wherein the means for performing, for each of the plurality of tuning registers values sets, the test data transfer comprises means for reading, for each of the plurality of tuning registers values sets, the one or more I/O pins with the corresponding one or more read delay tuning registers values.

Example 88 includes the subject matter of any of Examples 62-87, and wherein the one or more tuning registers comprise one or more I/O pin characteristics registers, wherein the one or more I/O pin characteristics registers indicate one or more termination impedances to be used for one or more I/O pins of the I/O host controller, and wherein each of the plurality of tuning registers values sets includes one or more I/O pin characteristics registers values.

Example 89 includes the subject matter of any of Examples 62-88, and wherein the one or more I/O pin characteristics registers comprise a single I/O pin characteristics register, wherein the single I/O pin characteristics register indicates a single termination impedance to be used for each of the one or more I/O pins, and wherein each of the plurality of tuning registers values sets includes a single I/O pin characteristics register value.

Example 90 includes the subject matter of any of Examples 62-89, and wherein the one or more I/O pin characteristics registers comprise a plurality of I/O pin characteristics registers, wherein each of the plurality of I/O pin characteristics registers indicates a corresponding termination impedance to be used for a corresponding I/O pin of the one or more I/O pins, and wherein each of the plurality of tuning registers values includes a plurality of I/O pin characteristics registers values.

Example 91 includes the subject matter of any of Examples 62-90, and, wherein the means for applying, for each of the plurality of tuning registers values sets, the corresponding tuning registers values set comprises means for applying, for each of the plurality of tuning registers values sets, the one or more I/O pin characteristics registers values to the one or more I/O pin characteristics registers, and wherein the means for performing, for each of the plurality of tuning registers values sets, the test data transfer comprises means for reading, for each of the plurality of tuning registers values sets, the one or more I/O pins with the corresponding one or more I/O pin characteristics registers values.

The invention claimed is:

1. A compute device comprising:
an I/O host controller including one or more tuning registers;
an error detector to determine if a test data transfer was successful, the data transfer considered successful when an error detecting code of the transferred data is validated;
an I/O tuning filter to:
determine a plurality of tuning registers values sets, wherein each tuning registers values set indicates a setting for each of the one or more tuning registers;
apply, for each of the plurality of tuning registers values sets, a corresponding tuning registers values set to the one or more tuning registers;
perform, for each of the plurality of tuning registers values sets, a test data transfer between the compute device and a first I/O device using the I/O host controller with the corresponding tuning registers values set;
determine, for each of the plurality of tuning registers values sets, whether the corresponding test data transfer was successful; and
store, in a tuning registers values table of the compute device, an indication for each of at least two tuning registers values sets of the plurality of tuning registers values sets in response to a determination that the corresponding test data transfer of each of the at least two tuning registers values sets was successful, wherein a corresponding weight value associated with each of the at least two tuning registers values sets indicates whether the test data transfer was successful, and wherein the corresponding weight value associated with each of the at least two tuning registers values sets is increased in response to the determination that the corresponding test data transfer of each of the at least two tuning registers values sets was successful.

2. The compute device of claim 1, further including:
a data transferer to:
apply a first tuning registers values set of the at least two tuning registers values sets to the I/O host controller;
perform a first data transfer between the compute device and a second I/O device using the I/O host controller with the first tuning registers values set; and
determine whether the first data transfer was successful; and
an I/O tuning refiner to:
update the tuning registers values table in response to a determination that the first data transfer was not successful; and
apply, in response to the determination that the first data transfer was not successful, a second tuning registers values set of the at least two tuning registers values sets to the I/O host controller; wherein the data transferer is further to:
perform, in response to the determination that the first data transfer was not successful, a second data transfer between the compute device and the second I/O device using the I/O host controller with the second tuning registers values set; and determine whether the second data transfer was successful, and wherein the I/O tuning refiner is further to update the tuning registers values table in response to a determination that the second data transfer was successful.

3. The compute device of claim 2,
wherein the tuning registers values table includes a plurality of weight values,
wherein each of the plurality of weight values corresponds to one of the tuning registers values sets of the at least two tuning registers values sets,
wherein each weight value of the plurality of weight values indicates a past performance of one or more past data transfers using the corresponding tuning registers values set,
wherein the one or more past data transfers are different from the corresponding test data transfer,
wherein to apply the first tuning registers values set of the at least two tuning registers values sets includes to select, based on the plurality of weight values, the first tuning registers values set.

4. The compute device of claim 3, wherein the I/O tuning refiner is further to:
update, in response to the determination that the first data transfer was not successful, the weight value of the plurality of weight values corresponding to the first tuning registers values set; and
update, in response to the determination that the second data transfer was successful, the weight value of the plurality of weight values corresponding to the second tuning registers values set.

5. The compute device of claim 3, wherein to apply the second tuning registers values set includes:
determining a plurality of distance parameters, wherein each of the plurality of distance parameters indicates a distance to a corresponding tuning registers values set of the at least two tuning registers values sets from the first tuning registers values set;
determining whether the second tuning registers values set has the corresponding smallest distance parameter of the plurality of distance parameters; and
applying, based on a determination that the second tuning registers values set has the corresponding smallest distance parameter, the second tuning registers values set to the I/O host controller.

6. The compute device of claim 5, wherein the distance from the first tuning registers values set to the corresponding tuning registers values set of the at least two tuning registers values sets indicates a number of values of the corresponding tuning registers values set different from the first tuning registers values set.

7. The compute device of claim 1, wherein to store, in the tuning registers values table, an indication of the at least two tuning registers values sets of the plurality of tuning registers values sets for which the test data transfer was successful includes storing, in the tuning registers values table, each tuning registers values set for which the test data transfer was successful.

8. The compute device of claim 1, wherein the I/O host controller is an SDIO host controller.

9. The compute device of claim 1,
wherein the one or more tuning registers includes one or more edge sampling registers,
wherein the one or more edge sampling registers indicate whether the I/O host controller is to read one or more I/O pins of the I/O host controller at a rising edge of a clock signal of the I/O host device or at a falling edge of the clock signal, and
wherein each of the plurality of tuning registers values sets includes one or more edge sampling registers values.

10. The compute device of claim 1,
wherein the one or more tuning registers include one or more write delay tuning registers,
wherein the one or more write delay tuning registers indicate one or more temporal write delays that the I/O host controller is to use to write to one or more I/O pins of the I/O host controller, and
wherein each of the plurality of tuning registers values sets includes one or more write delay tuning registers values.

11. The compute device of claim 1,
wherein the one or more tuning registers include one or more I/O pin characteristics registers,
wherein the one or more I/O pin characteristics registers indicate one or more termination impedances to be used for one or more I/O pins of the I/O host controller, and
wherein each of the plurality of tuning registers values sets includes one or more I/O pin characteristics registers values.

12. One or more non-transitory computer-readable storage media comprising a plurality of instructions that, when executed, cause a compute device to at least:
determine a plurality of tuning registers values sets, wherein each tuning registers values set indicates a setting for one or more tuning registers of an I/O host controller of the compute device;
apply, for each of the plurality of tuning registers values sets, the corresponding tuning registers values set to the one or more tuning registers;
perform, for each of the plurality of tuning registers values sets, a test data transfer between the compute device and a first I/O device using the I/O host controller with the corresponding tuning registers values set;
determine, for each of the plurality of tuning registers values sets, whether the corresponding test data transfer was successful by validating an error detecting code included in the test data transfer; and
store, in a tuning registers values table of the compute device, an indication for each of at least two tuning registers values sets of the plurality of tuning registers values sets in response to a determination that the corresponding test data transfer of each of the at least two tuning registers values sets was successful,
wherein a corresponding weight value associated with each of the at least two tuning registers values sets indicates whether the test data transfer was successful, and
wherein the corresponding weight value associated with each of the at least two tuning registers values sets is increased in response so the determination that the corresponding test data transfer of each of the at least two tuning registers values sets was successful.

13. The one or more non-transitory computer-readable storage media of claim 12, wherein the plurality of instructions, when executed, cause the compute device to:
apply a first tuning registers values set of the at least two tuning registers values sets to the I/O host controller;
perform a first data transfer between the compute device and a second I/O device using the I/O host controller with the first tuning registers values set;

determine whether the first data transfer was successful;
update the tuning registers values table in response to a determination that the first data transfer was not successful;
apply, in response to the determination that the first data transfer was not successful, a second tuning registers values set of the at least two tuning registers values sets to the I/O host controller;
perform, in response to the determination that the first data transfer was not successful, a second data transfer between the compute device and the second I/O device using the I/O host controller with the second tuning registers values set;
determine whether the second data transfer was successful; and
update the tuning registers values table in response to a determination that the second data transfer was successful.

14. The one or more non-transitory computer-readable storage media of claim 13,
wherein the tuning registers values table includes a plurality of weight values,
wherein each of the plurality of weight values corresponds to one of the tuning registers values sets of the at least two tuning registers values sets,
wherein each weight value of the plurality of weight values indicates a past performance of one or more past data transfers using the corresponding tuning registers values set,
wherein the one or more past data transfers are different from the corresponding test data transfer, and
wherein to apply the first tuning registers values set of the at least two tuning registers values sets, the compute device is to select comprises selecting, based on the plurality of weight values, the first tuning registers values set.

15. The one or more non-transitory computer-readable storage media of claim 14, wherein the plurality of instructions, when executed, cause the compute device to:
update, in response to the determination that the first data transfer was not successful, the weight value of the plurality of weight values corresponding to the first tuning registers values set; and
update, in response to the determination that the second data transfer was successful, the weight value of the plurality of weight values corresponding to a second timing registers values set.

16. The one or more non-transitory computer-readable storage media of claim 14, wherein to apply the second tuning registers values set, the compute device is to:
determine a plurality of distance parameters, wherein each of the plurality of distance parameters indicates a distance to a corresponding tuning registers values set of the at least two tuning registers values sets from the first tuning registers values set;
determine whether the second tuning registers values set has the corresponding smallest distance parameter of the plurality of distance parameters; and
apply, based on a determination that the second tuning registers values set has the corresponding smallest distance parameter, the second tuning registers values set to the I/O host controller.

17. The one or more non-transitory computer-readable storage media of claim 16, wherein the distance from the first tuning registers values set to the corresponding tuning registers values set of the at least two tuning registers values sets indicates a number of values of the corresponding tuning registers values set different from the first tuning registers values set.

18. The one or more non-transitory computer-readable storage media of claim 12, wherein to store, in the tuning registers values table, the indication of the at least two tuning registers values sets of the plurality of tuning registers values sets for which the test data transfer was successful, the compute device is to store, in the tuning registers values table, each tuning registers values set for which the test data transfer was successful.

19. A method comprising:
determining, by a compute device, a plurality of tuning registers values sets, wherein each tuning registers values set indicates a setting for one or more tuning registers of an I/O host controller of the compute device;
applying, by the compute device and for each of the plurality of tuning registers values sets, a corresponding tuning registers values set to the one or more tuning registers;
performing, by the compute device and for each of the plurality of tuning registers values sets, a test data transfer between the compute device and a first I/O device using the I/O host controller with the corresponding tuning registers values set;
determining, by the compute device and for each of the plurality of tuning registers values sets, whether the corresponding test data transfer was successful by validating an error detecting code included in the test data transfer; and
storing, by the compute device and in a tuning registers values table of the compute device, an indication for each of at least two tuning registers values sets of the plurality of tuning registers values sets in response to a determination that the corresponding test data transfer of each of the at least two tuning registers values sets was successful, wherein a corresponding weight value associated with each of the at least two tuning registers values sets indicates whether the test data transfer was successful, and wherein the corresponding weight value associated with each of the at least two tuning registers values sets is increased in response to the determination that the corresponding test data transfer of each of the at least two tuning registers values sets was successful.

20. The method of claim 19, further including:
applying, by the compute device, a first tuning registers values set of the at least two tuning registers values sets to the I/O host controller;
performing, by the compute device, a first data transfer between the compute device and a second I/O device using the I/O host controller with the first tuning registers values set;
determining, by the compute device, whether the first data transfer was successful;
updating, by the compute device, the tuning registers values table in response to a determination that the first data transfer was not successful;
applying, by the compute device and in response to the determination that the first data transfer was not successful, a second tuning registers values set of the at least two tuning registers values sets to the I/O host controller;
performing, by the compute device and in response to the determination that the first data transfer was not successful, a second data transfer between the compute device and the second I/O device using the I/O host controller with the second tuning registers values set;

determining, by the compute device, whether the second data transfer was successful; and updating, by the compute device, the tuning registers values table in response to a determination that the second data transfer was successful.

21. The method of claim 20, wherein the tuning registers values table includes a plurality of weight values, wherein each of the plurality of weight values corresponds to one of the tuning registers values sets of the at least two tuning registers values sets, wherein each weight value of the plurality of weight values indicates a past performance of one or more past data transfers using the corresponding tuning registers values set, wherein the one or more past data transfers are different from the corresponding test data transfer, and wherein applying the first tuning registers values set of the at least two tuning registers values sets includes selecting, by the compute device and based on the plurality of weight values, the first tuning registers values set.

22. The method of claim 21, further including:

updating, in response to the determination that the first data transfer was not successful, the weight value of the plurality of weight values corresponding to the first tuning registers values set; and updating, in response to the determination that the second data transfer was successful, the weight value of the plurality of weight values corresponding to the second tuning registers values set.

23. The method of claim 21, wherein applying the second tuning registers values set includes:

determining, by the compute device, a plurality of distance parameters, wherein each of the plurality of distance parameters indicates a distance to a corresponding tuning registers values set of the at least two tuning registers values sets from the first tuning registers values set;

determining, by the compute device, whether the second tuning registers values set has the corresponding smallest distance parameter of the plurality of distance parameters; and applying, by the compute device and based on a determination that the second tuning registers values set has the corresponding smallest distance parameter, the second tuning registers values set to the I/O host controller.

24. The method of claim 23, wherein the distance from the first tuning registers values set to the corresponding tuning registers values set of the at least two tuning registers values sets indicates a number of values of the corresponding tuning registers values set different from the first tuning registers values set.

25. The method of claim 19, wherein storing, in the tuning registers values table, an indication of the at least two tuning registers values sets of the plurality of tuning registers values sets for which the test data transfer was successful includes storing, in the tuning registers values table, each tuning registers values set for which the test data transfer was successful.

* * * * *